United States Patent Office 3,323,871
Patented June 6, 1967

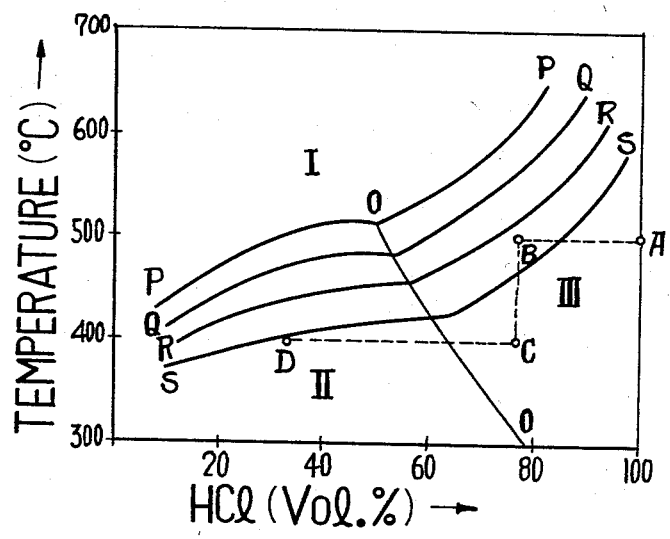

3,323,871
PROCESS FOR THE PRODUCTION OF CHLORINE
Heihachiro Fukuzawa, Tadashi Namba, and Yasuo Niwa, Tokyo, and Tetsuya Uchino, Yokohama, Japan, assignors to Asahi Glass Co., Ltd., Tokyo, Japan, a corporation of Japan
Filed June 19, 1964, Ser. No. 376,354
Claims priority, application Japan, June 26, 1963,
38/32,898, 38/32,899
10 Claims. (Cl. 23—219)

The present invention relates to a process for the production of chlorine from ammonium chloride or hydrogen chloride, and more particularly, to a process for the production of chloride from ammonium chloride or hydrogen chloride while granular magnesium oxide being used in circulation.

It is already known to produce chlorine from ammonium chloride or hydrogen chloride by reacting magnesium oxide with ammonium chloride or hydrogen chloride to produce magnesium chloride (chlorination) and oxidizing said magnesium chloride with oxygen or air to obtain chlorine and magnesium oxide (oxidation).

$$MgO + 2HCl \rightarrow MgCl_2 + H_2O \tag{1}$$
$$MgCl_2 + \tfrac{1}{2}O_2 \rightarrow MgO + Cl_2 \tag{2}$$

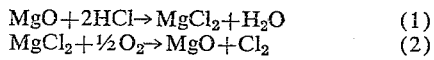
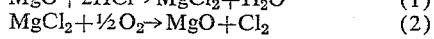

It has been found that when this process is applied to an industrial production of chlorine, various following difficulties are encountered: that is, (a) hydrogen chloride contaiminates chlorine; (b) the conversion rate of ammonium chloride or hydrogen chloride to chlorine is low; and (c) magnesium oxide in the form of dust is scattered at the time of oxidation of magnesium chloride.

The present inventors have conducted numerous experiments and studies in regard with the mechanism of chlorinating reaction to overcome such difficulties and ascertained the following facts. That is, the reaction of magnesium oxide with ammonium chloride or hydrogen chloride proceeds in which such stages as follows and the conditions suitable for proceeding each reaction are different.

$$2NH_4Cl \rightarrow 2NH_3 + 2HCl \tag{3}$$
$$MgO + HCl \rightarrow MgOHCl + 23 \text{ kcal.} \tag{4}$$
$$MgOHCl + HCl \rightarrow MgCl_2 + H_2O - 5 \text{ kcal.} \tag{5}$$

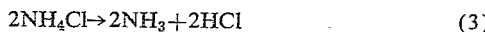
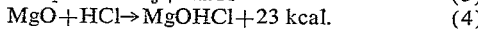
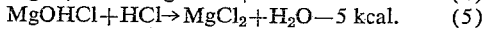

It has now been found that the greater part of the said difficulties is brought about because of these reactions being carried out in the same condition and hydrogen chlorides in chlorine is produced by decomposition in the oxidizing stage of magnesium oxy-chloride.

It is an object of the present invention to provide a means for producing magnesium chloride free from magnesium oxy-chloride.

Another object of this invention is to provide a process for manufacturing chlorine with low content of hydrogen chloride industrially from ammonium chloride or hydrogen chloride with a high efficiency.

A further object of the present invention is to provide a process for the production of chlorine from ammonium chloride or hydrogen chloride on an industrial scale, by using granular magnesium oxide easy to handle.

Other objects and advantageous features of this invention will be apparent from the illustration relating to the accompanying drawing showing the principle of this invention, and the following description.

The accompanying drawing is a phase diagram showing the principle of the present invention and represents equilibrium relationship in the reaction system shown respectively by chemical reaction Equations 4 and 5.

In this reaction system, a solid phase existing in an equilibrium with hydrogen chloride and water vapors in gaseous phase changes in accordance with the temperature and pressure and is magnesium oxide, or magnesium oxy-chloride, or magnesium oxy-chloride and magnesium chloride. In the phase diagram represented by the proportion (volume percent) of hydrogen chloride to the sum (total pressure) of hydrogen chloride and water vapors in gaseous phase and the temperature, the stable region for magnesium oxide (I) is separated from the stable region for magnesium oxy-chloride (II) and the stable region for both magnesium oxy-chloride and magnesium chloride (III) by curves P—P, Q—Q, R—R and S—S. P—P corresponds to a case where the total pressure of hydrogen chloride and water vapor is 1.0 atmospheric pressure (absolute pressure). Q—Q, R—R and S—S represent respectively cases where the total pressure is 0.5, 0.25 and 0.1 atmospheric pressure. The stable region for magnesium oxy-chloride (II) and the stable region for both magnesium oxy-chloride and magnesium chloride (III) are separated by a curve O—O.

From this phase diagram, the following can be concluded:

In general, the total pressure and the proportion of hydrogen chloride in the gaseous phase decrease as the reactions 4 and 5 proceed. Consequently, in a high temperature, the stable solid phase changes from magnesium chloride to magnesium oxide with the proceeding of the reaction, and the reaction becomes hard to proceed. In a low temperature, oxy-chloride is stable in the solid phase even in a condition wherein the concentration of hydrogen chloride is low, and so magnesium oxide is able to be changed to its oxy-chloride. Thus, in the reaction of hydrogen chloride with magnesium oxide, the magnesium oxide is preferably converted to magnesium chloride in high temperatures under the condition wherein the total pressure (the sum of the pressures of hydrogen chloride and water vapor) and the proportion of hydrogen chloride are higher. Under the condition wherein the total pressure and the proportion of hydrogen chloride are smaller, is preferred for magnesium oxide to be converted to magnesium oxy-chloride at a low temperature. This relationship is also similar in a case where inert gas such as ammonia or nitrogen not taking part in these reactions is co-existing.

Thus, in the present invention, magnesium oxide and ammonium chloride or hydrogen chloride should be supplied and transferred in a counter-current. The reaction temperature should be controlled or adjusted in such a manner that it may be changed from low temperature to high temperature in the range of 350 to 600° C. as the magnesium oxide transfers. In the temperatures below 350° C. the reaction velocity of magnesium oxide falls to unsatisfactory value.

In the present invention, the reaction conditions of chlorination are shown, by way of example, as follows in the preceding phase diagram.

Hydrogen chloride (A) having partial pressure of 0.25 atmosphere starts to react at 500° C., and the reaction is continued at the temperature, until the proportion of hydrogen chloride is lowered to about 75% (B); Thus about 40% of supplied hydrogen chloride are consumed for converting magnesium oxy-chloride to magnesium chloride at 500° C. Then, the remaining hydrogen chloride is caused to react at 400° C., (C) and the reaction is continued until the proportion of hydrogen chloride in the reaction gas is lowered to about 33% (D). Thus, 40% of supplied hydrogen chloride are further consumed to convert magnesium oxide to magnesium oxy-chloride at this temperature. The remaining gas (D) is composed of two volume parts of water vapor and one volume part of hydrogen chloride. In the case where ammonium chloride is used in lieu of hydrogen chloride, the remaining gas consists of 2 volume parts of water vapor, one volume part of ammonium chloride and 4 volume parts of ammonia. As those remaining gases are not economically reacted, hydrogen chloride and ammonium chloride are preferably recovered and recycled.

The above mentioned example is, for convenience, restricted to the case where the reaction is effected at both temperatures 500° C. and 400° C., but the present invention is not limited thereto, and the reaction may be accomplished at several different temperatures or in the temperature ranges. In one temperature range, the reaction temperature may vary consecutively. The final stage of chlorination of magnesium oxide is preferably effected at temperatures of from 500 to 550° C., while the first stage of chlorination is preferably effected at a temperature of from 350 to 420° C. Thus, according to the present invention, the production of magnesium chloride can be continuously carried out with a high efficiency while suppressing the formation of magnesium oxy-chloride as much as possible.

As the principle set forth above is not affected by the presence of inert gas, hydrogen chloride or ammonium chloride gas may be brought into contact with magnesium oxide at a desired temperature, the above gas being preferably diluted with inert gas such as nitrogen. The use of diluting gas is particularly suitable for the case where a fluidized-bed reactor is used which is described in detail hereinafter. The diluting gas not only serves for keeping magnesium oxide particles in the fluidized state, but also is effective for sublimating ammonium chloride crystals with a high efficiency. In the case where ammonium chloride vapor is evolved alone from ammonium chloride crystals by heating, ammonium chloride crystals show a tendency to adhere to one another or to the apparatus wall used. Nevertheless, if ammonium chloride crystals are introduced into a bed of inert particles such as silicate, silica sand and alumina at high temperatures, preferably at a temperature above 350° C. and also inert gas is blown therein, ammonium chloride vapor of the desired concentration will be obtained continuously by the sublimation with a high efficiency. The use of diluting gas is, of course, effective for attaining homogeneous contact between the ammonium chloride or hydrogen chloride and the magnesium oxide.

Magnesium chloride is oxidized with oxygen or air to evolve chlorine. For this evolution, the temperature above 600° C. is selected.

As described above, in the present invention, the temperature for chlorination step is different from that of oxidizing step. Moreover, the chlorination step per se is performed in a reaction zone of the different temperature range. Therefore, magnesium oxide should be shaped into a granule so as to be convenient for handling and particularly for circulation. For such magnesium oxide particles, i.e., granular magnesia, a high reactivity and satisfactory strength are requested. In the present invention, such granular magnesia may be obtained by baking magnesium hydroxide or magnesium carbonate alone or together with a small amount of mineralizer, such as $SiO_2$, $TiO_2$, CaO and $Cr_2O_3$, at a temperature above 1200° C. The preferred grain size of magnesia for fluidized-bed is within the range of the order of 16 to 100 Mé, preferably 30 to 50 Mé, and the grain size of moving bed is preferred to be 3 to 5 mm. diameter. In case where the baking is conducted at a temperature below 1200° C., granular magnesia having an extremely low strength will be obtained instead of high reactivity. Granular magnesia of suitable strength can be obtained by adopting such a condition that periclase crystal of 0.5 to 20μ may be formed in its particle. In general, the higher the baking temperature, the shorter the baking time should be. For instance, an appropriate time for baking is as follows at respective temperatures.

|  | ° C. |
|---|---|
| More than 5 hours | 1250 |
| 1 to 15 hours | 1300 |
| Less than 10 hours | 1400 |
| Less than 2 hours | 1600 |

When granular magnesia obtained by baking under said condition is reacted with hydrogen chloride gas at 500° C. for over 10 hours, the rate of conversion of magnesia (mole fraction) falls within the range of from 5 to 20%. Even when the magnesia is repeatedly recycled and used in the chlorinating step and the oxidizing step, the consumption or powdering of magnesia is held at a low value such that the practical operation may not be affected thereby. In carrying out the present invention on an industrial scale, it is appropriate to set the rate of chlorinating reaction of magnesia for below 20% preferably 15%.

According to the present invention, the chlorinating reaction may be effected in various apparatuses. For instance, granular magnesia is supplied at one end of an apparatus of longitudinal or vertical movable bed type, and partially chlorinated granular magnesia is discharged from the other end, and the reaction temperature is adjusted by jackets provided around the apparatus. Gaseous ammonium chloride or hydrogen chloride is introduced counter-currently to granular magnesia and transferred. However, in the apparatus of this type, the constructions of the feeding portion and discharge portion of the apparatus are complicated and particularly, in the apparatus of the longitudinal type, the adjustment of temperature is difficult. A chlorinating apparatus comprising a plurality of fluidized-beds is most advantageous as the temperature regulation and the supply and discharge of gas and magnesia are easy. The jackets provided around the apparatus may be passed by a suitable medium for cooling, heat-insulating or heating. Furthermore, a part of magnesium oxide may be introduced into a reaction zone at a high temperature for the purpose of regulating the temperature. In this way, a part of heat required for the aforesaid reaction Equation 5 can be supplied by the reaction Equation 4.

The discharging or exit gas, from the chlorinating step of magnesium oxide by ammonium chloride accompanying diluting gas such as nitrogen, consists of unreacted ammonium chloride, water vapor, ammonia and nitrogen, as already described. For recovering ammonium chloride from such mixed gas, the following means is recommended.

The discharging gas is introduced sidewise into the fluidized-bed of granular ammonium chloride held at 130 to 190° C., preferably 150 to 180° C. The unreacted ammonium chloride is cooled with said granular ammonium chloride and precipitates on its surface. The grown ammonium chloride grains are taken out from the fluidized-bed. The water vapor does not condense at this temperature nor disturb the precipitation of ammonium chloride. At a temperature below 130° C., ammonium chloride vapor becomes fine dust due to rapid cooling and hard to collect, while at a temperature above 190° C., the recovery of ammonium chloride vapor is difficult, as the vapor pressure of ammonium chloride is high. 90 to 95% of ammonium chloride vapor is easily recovered by this means. The remaining gas is fed into a condenser equipped with a water cooler, and ammonia water containing ammonium chloride is recovered therein. This solution can be utilized in an improved ammonium soda process, wherein sodium bi-carbonate and ammonium chloride are precipitated alternately. The remaining gas may also be washed with a mother liquor after sodium bi-carbonate being separated in the said improved ammonia soda process, thereby ammonia and ammonium chloride may be recovered.

This invention is further described in the following examples which are illustrative but not limitative thereof.

Example 1

3 grid plates, each having down take pipe, are located in a pipe having an inner diameter of 200 mm. at intervals of 1200 mm. Granular magnesia having a grain size of 30 to 50 Mé is fed at a rate of 130 kgs. per hour onto the grid plate of the highest level. The size of the down take pipe is so selected that the granular magnesia might successively fall on the grid plate of the lower level through the pipe, the diameter of which being approximately 20 mm. The chlorinated magnesia is taken out of the chlorinating tower from the lowest level.

The granular magnesia is produced as in the following:

100 parts by weight of dried magnesium are thoroughly mixed with 33 parts water and granulated in a rotary drum into particles of 15 to 20 Mé. The particles are dried at 100° C., and heated up to 1400° C. in an oven at a rate of 35° C./hour. The particles are cooled at the rate of 50° C./hour after baking for 4 hours at 1400° C. The grain size of granular magnesia obtained is in the range from 30 to 50 Mé.

Around the chlorinating tower there is provided a jacket for heat-insulating, in which high temperature combustion gas is fed, and the temperature of granular magnesia on the grid plate or grating of the highest level is controlled to approximately 400° C.; that for middle level is 460° C. and that of lowest level is approximately 550° C. Nitrogen gas at approximately 550° C. is blown through the lowest grid plate below into the chlorinating tower at a rate of 46 Nm.$^3$/hour to fluidize the granular magnesia on each grid plate and thereby fluidized beds of about 70 cm. in height, were respectively formed. Nitrogen gas to be supplied is accompanied by ammonium chloride vapor of 44 kg./hour. Nitrogen, ammonia and unreacted ammonium chloride are withdrawn from the top of the tower.

Mixed gas of nitrogen and ammonium chloride can be obtained in the following manner:

Grid plate is disposed in a pipe of 200 mm. inner diameter, onto which silica particles of 50 Mé grain size are fed at about 700° C. Nitrogen gas of 44 Nm.$^3$/hour is blown from below the grid plate. Silica particles form a fluidized bed of about 80 cm. height. Ammonium chloride crystals are introduced at a rate of 44 kg./hour into the fluidized bed, together with nitrogen of 2 Nm.$^3$/hour through a pipe installed about 70 cm. above the grid plate. A part of silica particles is taken out from the grid plate, heated and then returned thereto. Ammonium chloride crystals thus introduced, are sublimated by sensible heat of silica particles and a mixed gas of nitrogen and ammonium chloride is obtained.

Ammonium chloride vapor is brought into contact with granular magnesia counter-currently in the chlorinating tower, and reacts successively at 550° C., 460° C. and 400° C. From the top of tower, a gas mixture consisting of ammonia of about 11 kg./hour, unreacted ammonium chloride of about 10 kg./hour, water vapor of about 6 kg./hour and nitrogen of 46 Nm.$^3$/hour is obtained. From the fluidized bed of the lowest level, partially chlorinated granular magnesia of 148 kg./hour is obtained. The conversion rate of magnesium oxide to magnesium chloride corresponds to about 10%.

The granular magnesia partially chlorinated is introduced in an oxidizing apparatus, and oxidized at 650° C. with air of 43 Nm.$^3$/hour in the fluidized bed. Mixed gas containing 22 kg./hour of chlorine at the concentration of about 15% is obtained. This result means that approximately 90% of hydrogen chloride in ammonium chloride, which reacted in the chlorinating stage, have been converted to chlorine. Hydrogen chloride is contained in the resulting gas mixture in a proportion of approximately 2 kg./hour.

Granular magnesia restored in the oxidizing stage is used cyclically in the chlorinating stage. The total consumption rate of granular magnesia in the chlorinating and oxidizing stages is approximately 2.0% per day, based on the total amount of magnesia kept in the whole apparatus.

Nitrogen gas containing ammonia, water vapor and unreacted ammonium chloride and obtained from the top of the chlorinating reactor or reaction tower allows unreacted ammonium chloride to be recovered in the following treatment.

The mixed gas is introduced sidewise into the fluidized bed of granular ammonium chloride of 15 to 30 Mé and held at 150 to 190° C. The ammonium chloride vapor deposits on the surface of granular ammonium chloride. The grown ammonium chloride particles are taken out from beneath the fluidized bed, and nitrogen gas containing ammonia and water vapor is obtained from the top of tower. Ammonium chloride thus recovered is resublimated and reused cyclically for chlorinating reaction.

Example 2

Granular magnesia having a grain size of about 6 Mé produced in a manner similar to that of Example 1 is fed from the top of a tower having an inner diameter of 250 mm. therein to constitute the moving bed of about 2.5 m. in height and flows down within the tower slowly in 1.6 hours. The dried hydrogen chloride gas introduced into the tower from its lower portion, while water vapor and unreacted hydrogen chloride are discharged from the top of tower. The temperature of granular magnesia in the tower is controlled by the jacket provided around the tower so that the lower portion is held at about 550 to 500° C. and the upper portion at about 450 to 400° C. Dried hydrogen chloride and granular magnesia are supplied respectively in the proportion of approximately 28 kg./hour and approximately 110 kg./hour, and partially chlorinated granular magnesia of approximately 130 kg./hour is obtained. The conversion rate of magnesium oxide to magnesium chloride corresponds to approximately 13%.

Said partially chlorinated granular magnesia is oxidized with air. As a result, mixed gas is obtained which contains chlorine of 19 kg./hour at the concentration of about 12%. This result means that 71% of the hydrogen chloride reacted in the chlorinating stage have been converted to chlorine. Granular magnesia restored by oxidation is recycled to the chlorinating stage.

What we claim is:

1. In a cyclic process for producing chlorine by reacting at least one chloride selected from the group consisting of ammonium chloride and hydrogen chloride with granular magnesium oxide, while being transferred countercurrent to each other, to produce partially chlorinated granular magnesium oxide and reacting said partially chlorinated granular magnesium oxide with oxygen to produce chlorine and restore granular magnesium oxide for reaction with further chloride, the steps of controlling the temperature of the magnesium oxide in the first reaction stage at 350 to 420° C. and at 500 to 550° C. in the final reaction stage, raising the temperature of the magnesium oxide between said first and final reaction stages from the lower temperature of the first stage to the higher temperature of the final stage and controlling the extent of the chlorination of the magnesium oxide to below 15%.

2. A process as claimed in claim 1, wherein the said chloride is ammonium chloride and said ammonium chloride is diluted with inert gas.

3. A process as claimed in claim 2, wherein the inert gas is nitrogen.

4. A process as claimed in claim 2, wherein the gas mixture of ammonium chloride and inert gas is produced by introducing ammonium chloride crystals and inert gas into a fluidized bed of inert particles.

5. A process as claimed in claim 1, wherein granular magnesium oxide is produced by baking a granulated magnesium compound selected from the group consisting of magnesium hydroxide and magnesium carbonate at a temperature above 1200° C.

6. A process as claimed in claim 1, wherein granular magnesium oxide is transferred consecutively in multi-stage fluidized bed.

7. A process as claimed in claim 1, wherein granular magnesium oxide is transferred in a moving bed.

8. A process as claimed in claim 2, wherein unreacted ammonium chloride in the gas produced in the chlorinating stage is recovered, recycled and used in the chlorinating stage.

9. A process as claimed in claim 8, wherein the recovery of unreacted ammonium chloride is accomplished in a fluidized bed of granular ammonium chloride at 130 to 190° C.

10. In a cyclic process for producing chlorine by reacting ammonium chloride with granular magnesium oxide, while being transferred countercurrent to each other, to produce partially chlorinated granular magnesium oxide and reacting said partially chlorinated granular magnesium oxide with oxygen to produce chlorine and restore granular magnesium oxide for reaction with further chloride, the steps of transferring said granular magnesium oxide consecutively through a plurality of fluidized bed stages, controlling the temperature of the magnesium oxide in the first stage fluidized bed at 350 to 420° C. and at 500 to 550° C. in the final stage fluidized bed, raising the temperature of the magnesium oxide between the first and final fluidized bed stages from the lower temperature of the first stage fluidized bed to the higher temperature of the final stage fluidized bed, introducing ammonium chloride crystals and an inert gas into an inert bed of fluidized particles maintained at a temperature above 350° C. to cause the ammonium chloride to sublime, passing the ammonium chloride vapor inert gas mixture thus formed countercurrently to the granular magnesium oxide as it is transferred consecutively through said plurality of fluidized bed stages to react with the magnesium oxide being transferred through said stages and form partially chlorinated granular magnesium oxide and maintaining the extent of chlorination of the partially chlorinated magnesium oxide below 15%.

References Cited
UNITED STATES PATENTS

| | | | |
|---|---|---|---|
| 663,088 | 12/1900 | Naef | 23—219 X |
| 2,281,477 | 4/1942 | Chesny | 23—201 |
| 2,335,374 | 11/1943 | Woodward | 23—201 |
| 2,436,870 | 3/1948 | Murphree | 23—219 |
| 2,760,846 | 8/1956 | Richmond et al. | 23—202 |

OSCAR R. VERTIZ, *Primary Examiner.*

EDWARD STERN, *Examiner.*